UNITED STATES PATENT OFFICE.

WALTER E. HARTER, OF WEST NANTICOKE, PENNSYLVANIA.

PROCESS OF DRESSING LEATHER.

SPECIFICATION forming part of Letters Patent No. 406,901, dated July 16, 1889.

Application filed January 18, 1889. Serial No. 296,735. (No specimens.)

*To all whom it may concern:*

Be it known that I, WALTER E. HARTER, a resident of West Nanticoke, in the county of Luzerne and State of Pennsylvania, have invented certain new and useful Improvements in Liquid Dressing for Leather; and I do hereby declare the following to be a full, clear, and exact description of the invention, such as will enable others skilled in the art to which it pertains to make and use the same.

My invention relates to an improvement in the method of dressing leather.

For dressing leather I first make a composition consisting of one ounce powdered alum, one ounce bicarbonate of soda, one ounce powdered borax, and four ounces washing-soda dissolved in one gallon of rain-water. This composition is applied to the grain side of the leather, and is well rubbed into the same with the hands or by a brush, and after standing a few minutes—say from five to ten minutes—all that remains on the surface of the leather is wiped off with a sponge or cloth. This application serves to remove all grease, dirt, and sediment from the leather, and also serves to soften the same and render it extremely pliable. I then make a coloring composition consisting of five ounces of iron scales, from an anvil or from wrought-iron, dissolved in one quart of pure cider-vinegar. This coloring composition is applied also to the grain side of the leather, enough being used to entirely cover the same, and after thoroughly working or rubbing in the coloring composition it is permitted to stand on the leather for about ten minutes, after which all the surplus composition is removed with a sponge or cloth. This composition gives a fine black gloss to the leather, and completes the preparation of the same before working it into boots, shoes, harness, and other articles.

A light coating of castor-oil applied to the leather serves to improve the luster.

Having thus described my invention, I claim—

The method of dressing leather, consisting, first, in applying thereto a compound of alum, bicarbonate of soda, borax, and washing-soda dissolved in water, and, second, by applying a coloring composition of iron scales and cider-vinegar, and, third, by coating the leather with castor-oil, substantially as described.

In testimony whereof I have signed this specification in the presence of two subscribing witnesses.

WALTER E. HARTER.

Witnesses:
 WM. G. MORRIS,
 R. F. WATTS.